United States Patent [19]

Bachmann

[11] Patent Number: 5,269,436
[45] Date of Patent: Dec. 14, 1993

[54] DOUBLE-WALL TANK AND METHOD OF ITS MANUFACTURE

[75] Inventor: Werner Bachmann, Mutschellen, Switzerland

[73] Assignee: Adisa Entwicklungs AG, Urdorf, Switzerland

[21] Appl. No.: 928,967

[22] Filed: Aug. 11, 1992

[51] Int. Cl.⁵ .............................. B65D 25/14
[52] U.S. Cl. ...................... 220/469; 220/450; 220/425; 220/445; 220/565; 73/49.2
[58] Field of Search ............... 73/49.2 T; 220/425, 220/469, 450, 442, 4.12, 565, 626, 470, 461, 457, 645, 648, 651, 652, 672, 654, 445

[56] References Cited

U.S. PATENT DOCUMENTS

| | | | |
|---|---|---|---|
| Re. 33,421 | 11/1990 | Bachmann | 220/461 |
| 2,269,617 | 1/1942 | Borstel | 220/654 |
| 3,394,841 | 7/1968 | Anderson | 220/645 |
| 3,764,035 | 10/1973 | Silverman | 220/445 |
| 4,308,967 | 1/1982 | Vater et al. | 220/648 |
| 4,344,543 | 8/1982 | Hoffman | 220/565 |
| 4,613,922 | 9/1986 | Bachmann | |
| 4,739,895 | 4/1988 | Bachmann | 220/565 |
| 4,916,939 | 4/1990 | Mogel | 220/457 |
| 5,054,645 | 10/1991 | Sharp | 220/469 |
| 5,143,244 | 9/1992 | Kauffman | 220/645 |
| 5,180,190 | 1/1993 | Kersey et al. | 220/565 |

FOREIGN PATENT DOCUMENTS

| | | | |
|---|---|---|---|
| 0122980 | 10/1984 | European Pat. Off. | |
| 2658088 | 7/1978 | Fed. Rep. of Germany | 220/461 |
| 3739453 | 5/1989 | Fed. Rep. of Germany | |
| 440134 | 12/1967 | Switzerland | |
| 471728 | 6/1969 | Switzerland | |
| 480243 | 12/1969 | Switzerland | |
| 517630 | 2/1972 | Switzerland | |
| 618658 | 8/1980 | Switzerland | |
| 1514688 | 10/1989 | U.S.S.R. | 220/442 |

Primary Examiner—Allan N. Shoap
Assistant Examiner—S. Castellano
Attorney, Agent, or Firm—Frishauf, Holtz, Goodman & Woodward

[57] ABSTRACT

To improve the strength, resistance to leaks, and formation of tears and fissures in the inner wall of a double-wall tank, the inner wall is formed, as described in the inventor's earlier U.S. Pat. No. 4,739,895 (U.S. Pat. No. Re. 33,421) by a plurality of foil or sheet elements which are overlapped at the edges, and covered by a plastic, preferably epoxy layer. The sheet elements are preferably aluminum foils of from 0.15 to 0.3 mm, preferably 0.2 mm thickness. The plastic layer is reinforced by a multi-ply, preferably two-ply, glass fiber fabric, which is so woven that the layers or plies of the fabric are interwoven or interlocked. The fabric is embedded in the plastic coating, before it is cured, for example by rolling it into the plastic coating. To assure good fitting of the inner wall against the outer wall, a vacuum is applied in the space formed by the projections or puckers of the sheet elements and the outer wall before the plastic coating has cured, and maintained until it is cured. The sheet or foil elements and the reinforced plastic will then form a laminate of high inherent stability with high bending and tensile strength, so that fissures are effectively avoided and the tank construction will be reliably tight and highly resistant to the formation of bulges and damage, for example due to dropped tools during installation, or inspection.

17 Claims, 3 Drawing Sheets

DOUBLE-WALL TANK AND METHOD OF ITS MANUFACTURE

Reference to related patents by the inventor hereof, the disclosures of which are hereby incorporated by reference:
U.S. Pat. No. 4,613,922, Bachmann
U.S. Pat. No. 4,739,895, and its reissue U.S. Pat. No. Re. 33,421 of Nov. 6, 1990.
Reference to related publications, describing the state of the art:

| Swiss Patent No. | Inventor |
| --- | --- |
| 440,134 | Schmuki |
| 465,498 | Schmuki (addition to Swiss 440,134) |
| 471,728 | Schmuki et al |
| 480,243 | Wolf |
| 517,630 | Ulmann |
| 618,658 | Grossenbacher |

German 37 39 453, Panzer et al
European Application 01 22 980, Casassa.

FIELD OF THE INVENTION

The present invention relates to multi-hulled tanks, and more particularly to double-wall tanks, having an outer wall and an inner wall, in which the inner wall is spaced from the outer wall to define a test or leakage chamber or space, which is sturdy, and readily constructed; and to a method of its manufacture.

BACKGROUND

Swiss Pat. No. 440,134 describes a double-wall tank having an inner wall, for example made of steel, and an outer wall made of plastic. A spacer structure in form of a wire grid or wire mesh or wire weave is located between the inner wall and the outer wall. The wire mesh or grid forms a substrate for a foil forming the outer wall, located on the wire grid or wire weave. The foil described may be a cellulose foil of about 0.06 mm thickness, or an aluminum foil of about 0.1 mm thickness. The foils are used as substrates for a relatively thick layer made of glass fiber reinforced plastic, thereby forming a double-wall tank. The double wall is used to increase the safety and reliability of the tank with respect to leaks of liquid retained in the tank. A leakage warning apparatus is provided which indicates a leak at the inner wall.

The construction is difficult to make since the wire mesh as well as the foil must be handled and placed. The foil, effectively, adds only little to the strength of the wall. The wall, thus, must be made of a relatively thick plastic layer which, additionally, is reinforced with fibers, typically glass fibers. This plastic layer requires much material, and the construction thereof is relatively complex since it is applied by spraying. The spray apparatus must include a glass fiber cutter. It is unavoidable that glass fibers become loose and fly about. The glass fibers easily penetrate the skin of operators and result in itching. Loose glass fibers, additionally, interfere with working within the tank, and, in some cases, make working within the tank completely impossible.

The Swiss Pat. No. 440,134 describes such a tank in which only the outer wall is made of such plastic material. The outer wall must be carefully made to avoid the inclusion of air bubbles, requiring rolling out of the applied plastic material to eliminate the formation of any such air bubbles. Air bubbles may, otherwise, be introduced upon spraying of the plastic material together with the glass fibers. The rolling-out of the fiber-reinforced plastic wall is time-consuming, and hence expensive.

Swiss Patent of Addition No. 466,498, forming an addition to the previously discussed main patent. Swiss No. 440,134, discloses use of a plastic grid or mesh instead of a wire grid or mesh. The plastic grid has the advantage that it is substantially more flexible than metal, and is also somewhat stretchable, so that its application is simplified. In all other respects, however, the difficulties of manufacture which arise in the construction explained in connection with the main patent still pertain.

Swiss Pat. No. 471,728 describes a double-wall tank having an inner wall made of steel and an outer wall made of plastic. A spacer in the form of a foil is described, the spacer being formed with impressed or punched bumps or warts, which are facing the inner wall and are supported against the inner wall. The description proposes a spacer wall of about 0.2 mm sheet steel or sheet aluminum.

The arrangement has an advantage over the tank in accordance with the previously discussed Swiss Pat. No. 440,134 since this very thin foil can be placed about the surface of the inner wall more easily than the wire mesh which, when using a wire diameter sufficient to form a suitable chamber or hollow space between the tank walls, is comparatively stiff. All other disadvantages of the tank described in connection with Swiss Pat. No. 440,134, however, still pertain. The description is directed to the manufacture of an outer wall made of plastic, but not to an inner wall made of plastic.

Swiss Pat. No. 480,243 describes an inner jacket for a storage container which is liquid-tight. An embossed foil is located in the region of the vertical side walls. The bottom of the tank utilizes as an intermediate layer a porous mass, for example porous concrete.

Swiss Pat. No. 517,630 describes a tank to retain liquid having non-metallic walls. This liquid-containing tank has electrical conductors located on one of the wall surfaces so that the freedom from pores of the double walls of the tank can be tested; any pores which might occur can be localized by means of a spark inductor. The outer wall of the container, preferably, is made of concrete.

The conductive material is, preferably, an aluminum foil formed with bumps or warts or longitudinal ribs or ridges, for example in the form of creases. The aluminum foil may have from between 0.02 to 0.1 mm thickness. The bumps, warts, or ribs or ridges, for example longitudinal creases, form a test space for leakage between an outer wall and an inner wall. The inner wall is formed by a glass fiber reinforced plastic, for example polyester, polyurethane, or a thermoplastic material which has the required stability, pressure resistance and corrosion resistance with respect to the liquid to be introduced into the tank. The relatively thick and stiff plastic layer, and not the metallic layer, provides the necessary strength for the inner wall.

Swiss Pat. No. 618,658 describes a similar construction which is directed also to form a double bottom of an upright tank. Rather than using an aluminum foil with bumps or longitudinal creases, the description states that strong paper, such as Kraft paper or the like, or heavy wrapping paper may be used, formed with projections and recesses.

The paper is made by first applying a coating ink thereon which includes glass fibers having a fiber length of between 2.5 mm to 5 mm. The first layer applied is dried for 24 hours and then a second, usually colorless layer is applied. The strength of the inner wall is primarily governed by the layer reinforced with glass fibers; the heavy paper, formed with projections and depressions, hardly contributes anything to the strength. It is clear that, for such a construction, the plastic layer must be relatively thick. Consequently, the manufacture is time-consuming, particularly since after application of the first layer, a period 24 hours must be permitted to elapse. The use of plastic to manufacture a thick plastic layer is extensive.

U.S. Pat. No. 4,739,895, reissued under U.S. Pat. No. Re. 33,421, by the inventor hereof, describes a tank having a double bottom. The double bottom is formed by a bottom layer and a top layer, in which the top layer is constructed of a plurality of foil or sheet elements, each of a material having a strength characteristic of and a thickness requisite for the top layer of the double bottom, that is, to support the contents of the tank above the chamber defined by the two layers. The plurality of foil or sheet elements are located next to each other, preferably with overlap. The foil or sheet elements are formed with projections extending from a major surface of the foil or sheet element towards the bottom of the layer to have a puckered configuration. A fiber reinforced resin layer is applied and bridges over the terminal edges of adjacent foil or sheet elements. The foil or sheet elements, with the puckered surface facing downwardly towards the bottom of the tank then is covered-over in its entirety by a protective plastic layer cover. This protective layer cover will extend over the foil and sheet elements as well as over the fiber reinforced resin layer bridging the respective foil or sheet elements and connecting them together. It is of a thickness just sufficient for protection of the foil or sheet layer elements against attack from the contents of the tank without, however, substantially contributing to the strength of the top layer. Thus, the material of the protective layer prevents, for example, chemical attack on the puckered or embossed foil and fiber reinforced bridging elements which join the respective foil units to form a complete tank bottom.

This tank construction has a substantial advantage because, in contrast to the heretofore described structures, the embossed or puckered or ribbed foil is not merely an underlay for a plastic layer which forms the actual inner wall; rather, the embossed or puckered foils or sheet elements themselves provide the necessary strength for the inner wall. The plastic layer is, essentially, merely a protective layer to protect the foil or sheet elements with respect to the contents of the tank. This inner wall requires only little plastic material for its manufacture, since, for the major portion of the inner wall, the plastic layer need have a thickness of only about 1 mm to provide protection. Only at the junctions between individual puckered foil elements or sheets will the inner wall be somewhat thicker, and also be reinforced with a glass fiber reinforcement to form the junctions between the foil elements, so that the inner wall, there, will have the necessary strength.

This earlier patent by the inventor hereof also describes a method to make a double-wall tank. Preferably, but not necessarily, the inner side of the outer wall is coated with a protective layer of plastic material. The embossed, puckered or ribbed foil or sheet elements are then laid on the inner wall. Preferably, the placement is such that the individual sheet elements overlap. Plastic adhesive material is precoated at the end or edge surfaces of the sheet element, and, while still liquid, a glass fiber tape is laid thereon and rolled into the plastic mass.

When the overlapped foils are joined, a space will be formed between the inner wall and the outer wall to permit checking of the tank for leakage. The entire surface, now covered with the embossed, connected foil elements is then coated with a thin plastic coating, for example an epoxy. After all the plastic materials have cured or set, a tightness or leakage test or test for pores is made by a spark detector.

This tank was a substantial advance, both with respect to structure as well as cost of manufacture, in relation to prior art tanks. It has been found, however, that under highly stressful conditions, deformation of the inner wall may result which caused fissures to occur in the plastic coating, resulting in leakages.

German A 37 39 453, Panzer, describes a multi-layer internal structure to permit tests for leakage, for subterranean or buried tanks. The inner structural layer has at least six individual layers, namely an outer one formed of concrete, a porous or permeable drainage layer, an outer sealing layer, a permeable textile intermediate layer, and a plurality of layers of epoxy resin with fiberglass inserts for reinforcement, Such constructions are not suitable for much smaller tanks, and are extremely expensive to make. To prepare each layer, it is necessary to apply epoxy resin, to place a layer of glass fibers thereon which, then, is well rolled into the still liquid epoxy resin by means of a roller. Some time must then be permitted to elapse to permit the layer to cure. Before a subsequent layer can be made, the preceding layer must have cured, which substantially increases the manufacturing time and causes long delays and interruption in the smooth work flow. This has been described above already with reference to Swiss Patent 618,658, Grossenbacher. This process, thus, is not only very time-consuming and expensive but has the additional disadvantage that the layers do not adhere well above each other and have a tendency to delaminate.

THE INVENTION

It is an object to provide an improved tank and tank construction which can be easily made, and which is leakage-tight, even under stress or abuse conditions. This tank should have a high inherent stability and resistance to deformation, formation of bulges and the like, while still being readily constructed and requiring only little plastic resin in its manufacture.

Briefly, the tank can be made, basically, similar to that described in the aforementioned U.S. Pat. No. 4,739,895 (U.S. Pat. No. Re. 33,421) by the inventor hereof. In accordance with the present invention, then, the plastic layer is reinforced by interlocked layers of a multi-ply or multi-layer reinforcement, preferably a woven fiberglass mat.

The mat is so constructed that the individual strands or threads or yarns of the multiple layers or multiple plies interlock. Reinforcing the plastic coating or plastic layer effectively prevents the formation of fissures, tears or the like, in operation of the tank, and effectively protects the tank walls against even extreme abuse. The inner wall can be made by still using comparatively little plastic material. It will be highly resistant against blows, formation of bulges or bubbles, and has high tensile strength in all directions, while still remaining flexible. Its capability of holding liquids to an elevated level within the tank is high; the embossed regions, with bumps, puckers, ridges or, in general, small deformations to define the leakage test space or chamber, are not substantially deformed or squeezed together even under high loading stress, for example upon over-filling the tank. The substantial tensile strength of the threads of the reinforcement mat counteracts any tendency to compress the projections formed in the embossed sheet or foil elements.

The individual embossed sheet or foil elements preferably overlap at their junctions, so that a good interconnection between the foil elements is assured. This also substantially simplifies the manufacture of the inner wall, since individual fitting or matching of the inner wall structure to the outer wall is minimized.

In a preferred form, the embossed foils are primecoated, preferably on both sides, but at least on the side facing the eventual protective, reinforced layer. Priming the embossed foils improves the adhesion of the protective layer to the embossed foils, and thus improves the strength of the resulting laminar structure or laminate of the embossed foil-protective coating combination.

The embossed foil is preferably an aluminum foil having a thickness of between about 0.15 to 0.3 mm. Aluminum foils of such thickness are comparatively light and can be readily bent, thus substantially simplifying the manufacture of the inner wall and the task of the workmen fitting the inner wall against the outer wall. An aluminum embossed foil having a thickness of about 0.2 mm is particularly preferred. Such a foil has the necessary strength and is readily worked.

Other foils may be used, and for some application an embossed foil made of paper or cardboard can be used.

The plastic material forming the plastic layer applied on the puckered, embossed or ribbed or ridged layer is preferably epoxy resin. Epoxy has advantages over polyester in that annoying odors are effectively avoided.

The tank, in accordance with a feature of the invention, is so made that the foils are laid out on the inside of the outer wall, and at the future connections or junctions, of the inner wall with the outer wall, for example at the edge or adjacent an access hole, the foils are precoated with plastic resin material. Plastic resin material is also applied entirely over the inner surface, that is, the surface remote from the one facing the outer wall, with plastic material; when still at least somewhat liquid, the multi-ply or multi-layer glass fiber fabric, preferably in form of mats, is laid on the plastic material and rolled in. A further plastic layer is then applied over the rolled-in reinforcement fabric. This can be done immediately, so that the process is simple and can be carried out in a short time.

In accordance with a preferred feature of the invention, a vacuum or under-pressure is applied to the space between the outer wall and the embossed foil while the plastic material coating the inner surface of the embossed foils is still plastically flowable or somewhat fluid. This vacuum or under-pressure is applied until the resin has cured. It is also possible to start generating the under-pressure or vacuum immediately after the foils have been placed. Since the foils are relatively thick, they do not engage the inner surface of the outer wall throughout its extent. This is particularly the case if the foils were somewhat deformed when they were introduced into the outer wall of the tank, for example through an access or maintenance hole. Similar problems also occur in the region of the domed or cap-like ends of a cylindrical tank. By applying a vacuum, after connecting the individual embossed foils to each other, and sealing the edges of the foils against the outer wall, atmospheric pressure within the thus formed inner wall will press the embossed foils tightly against the inner surface of the outer wall. Since the plastic material coating the inner surface of the inner wall is still somewhat flowable and in plastically deformable condition, some relative shifting between the embossed foils and the existing outer wall of the tank is still possible. Thus, the inner wall can tightly fit against and match itself to the shape and configuration of the outer wall. Additionally, the condition in which a pressure differential exists between the inner wall and the outer wall also corresponds to the later operating state of the tank, that is, when it is filled.

In accordance with a preferred feature of the invention, the plastic is applied by an air-free spray process. Such application methods are particularly useful for working within the interior of a tank.

Some tanks are formed with reinforcement rings located at the inside surface of the outer wall. If the tank has such reinforcement rings, which may have, for example, general T-beam cross section, it is desirable to fill the space between the cross elements of the T-beam with a filler material, in such a way that the reinforcement cross section has, generally, trapezoidal shape, with the longer side of the trapezoid being adjacent the outer wall. The embossed foil can then readily be laid over the so filled and prepared reinforcement rings; their projections, ribs, bumps or puckers then will face the reinforcement ring or rings and the material which, in cross section, is trapezoidal and fills the space between cross elements of the reinforcement ring or rings.

DRAWINGS

DETAILED DESCRIPTION

Figure 1:
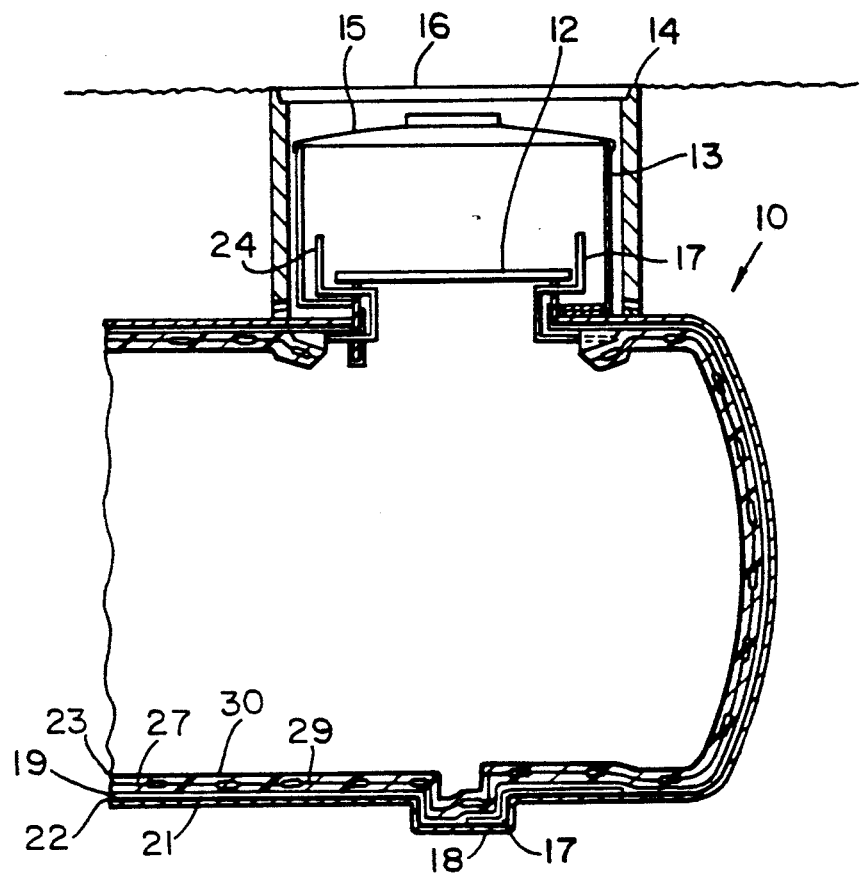
FIG. 1 is a highly schematic longitudinal cross section through a generally cylindrical tank which is horizontally positioned.

Referring first to FIG. 1 which illustrates, in vertical section, a horizontally positioned cylindrical tank, for example for underground installation. The present invention, however, is not limited to any particular shape or type of tank, and is equally applicable to upright tanks of other than circular cross section.

The tank 10 has a maintenance or access hole 12 surrounded by an entrance shaft way 13 which, in turn, is surrounded by a cement shaft way 14, in tubular form, A plastic cover 15 is located on the shaft way 13 and a closing cover 16 is located on the cement access shaft 14.

Figure 2:
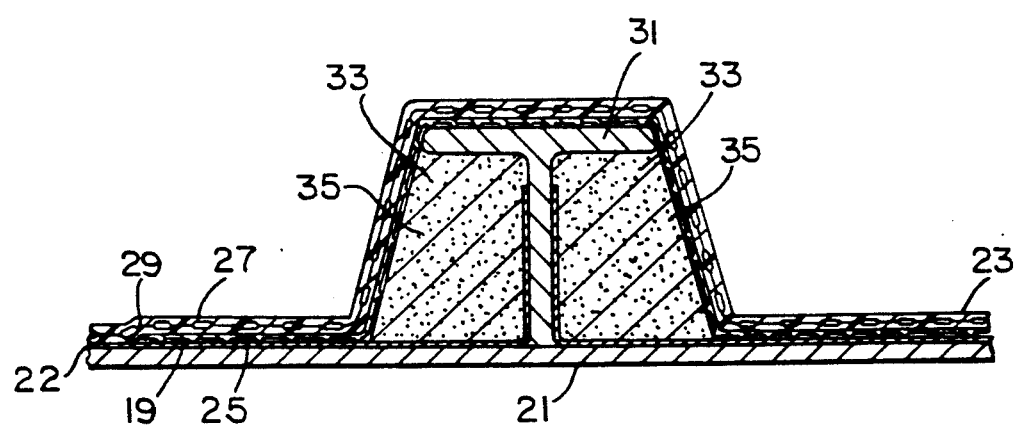
FIG. 2 is a fragmentary detailed view, to a substantially enlarged scale over that of FIG. 1, and illustrating the respective layers in greater detail and bridging of a reinforcement ring.
Figure 8:
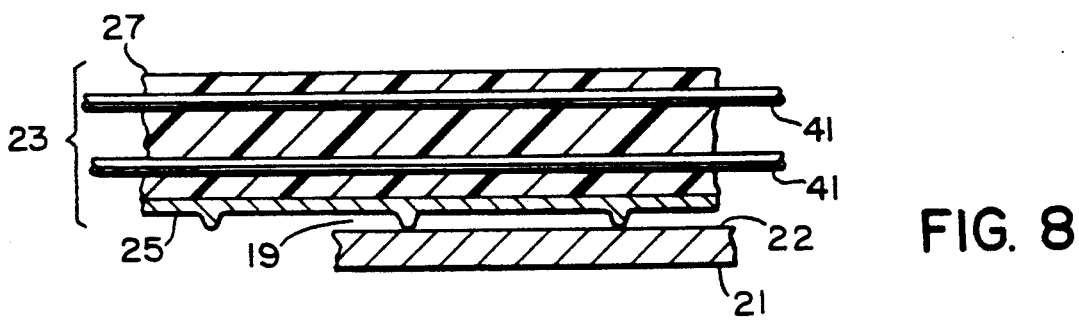
FIG. 8 is a highly schematic cross-sectional view of the inner wall, reinforced with a multi-ply or multi-layer fabric, in which the fabric portions or layers are spread apart for better visibility.

A suction tube 17 extends from the interior of the shaft way 13 to the lowest point of the tank, formed as a bottom depression or cup 18. The suction tube 17 is used to suck off any possible leakage fluid which might collect in the hollow or test space 19. The detailed construction of the tank walls is best seen in FIGS. 2 and 8. The hollow space 19 is located between the inner surface 22 of the outer wall 21 and the facing surface of the inner wall 23. The inner wall 23 is formed of a laminate which comprises a foil 25 (FIG. 2 and 8) and a plastic layer 27. The foil 25, which may be a sheet element, is formed with projections extending from the major surface thereof towards the inner surface of the outer wall 21, to form the space 19. For simplicity, the foil 25 will be termed as having a ridged configuration which is deemed to include a puckered, or ribbed, or embossed configuration.

In accordance with a feature of the invention, an interlocked multi-layer, preferably two-ply or two-layer glass fiber fabric 29, is embedded in the plastic layer 27. The foil 25, preferably, is an embossed aluminum sheet or a plurality of aluminum sheets joined together—see the referenced earlier patent by the inventor hereof, U.S. Pat. No. 4,739,885 (U.S. Pat. No. Re. 33,421), and the plastic material of the plastic layer is preferably epoxy. The embossed foil or foil group 25 has sufficient strength to form the inner wall. A thickness, if aluminum is used, of between 0.15 to 0.3 mm, preferably 0.2 mm, is sufficient. Embossed, ridged or ribbed aluminum foils are now commercially available in large sheets or mats, that is, sheets or mats which are sufficiently large in order to form the entire inner wall of a tank. Even if available, it would be practically impossible to introduce such a single foil through the access hole 12 into the interior of the tank. Thus, to form the inner wall, a group of foil elements, in elongated web or strip form, are used and placed next to each other, joined together for example as explained in the aforementioned earlier patent by the inventor hereof. For some applications, embossed, ridged or corrugated webs made of paper or cardboard or of plastic could be used. The multi-layer glass fiber reinforcement for the plastic material has a high inherent stability, as well as tensile strength, so that the resulting laminate will be sufficiently strong for many applications, even if aluminum is not used.

METHOD OF INSTALLATION OF INNER WALL 23

The inner surface of the outer wall 21 is preferably first coated with a protective coating 22. Webs of embossed foil or foil elements then are laid next to each other with some overlap of the individual web elements throughout the interior wall of the tank. A double-sided adhesive tape can be used for adhesion of the ridges, bumps, bulges, ribs or projecting buttons of the webs to the inner wall of the tank. For simplicity, the adhesive tape is not shown. After placement of the foils 25, and possibly after application of reinforced adhesive at the overlap regions, a layer of epoxy resin is applied. While the epoxy resin is still in flowable., deformable shape, a multi-layer, preferably two-layer or two-ply glass fiber weave 29 is applied thereover, and rolled into the still flowable and now somewhat tacky epoxy layer. In some regions, normally in the region of the access hole, the glass fiberweave 29 is extended beyond the edge of the last embossed foil 25 for connection, by means of the epoxy layer, directly with the outer wall 21 of the tank. Thus, a space 29 is formed between the outer wall 21 and the inner wall 23 which permits checking of the inner wall with respect to leaks.

In accordance with a preferred feature of the invention, a vacuum of about −0.8 bar is generated in the space 19. A vacuum pump—not shown—is attached to the suction tube 17. Any suitable measuring instrument, coupled to the connection between the suction tube and the vacuum pump or, preferably, coupled to a separate test or measuring line 24, can be used to check the vacuum and the maintenance of the vacuum. The vacuum is used not only for testing of tightness but, also, it has the particular feature that the not completely finished inner wall 23, that is, the already coupled embossed foils 25 and the plastic layer 27 engage snugly against the inside surface of the outer wall 21. Ambient air pressure will press the inner wall 23 against the outer wall 21.

After hardening or curing of the plastic layer, an additional leakage or pore check can be made, as well known, by use, for example, of a spark or high voltage leakage detector. For some installations, a further cover layer 30 (FIG. 1) is applied over the layer 27. This cover layer 30 is electrically conductive, and eventually grounded, in order to eliminate possible explosions or ignitions due to electrostatic discharges if liquids are stored which are combustible and/or potentially explosive.

Some tanks, particularly of larger sizes, may have internal reinforcement ribs. FIG. 2 illustrates an example of how a reinforcement ring 31, having two laterally projecting portions, extending essentially parallel to the wall, as shown of generally T-shaped cross section, can be bridged by the inner wall 23. The spaces 33 between the cross bar, i.e. the laterally projecting portion of the reinforcement ring 31 is filled with a filler mass 33, which is so shaped that the cross section of the reinforcement ring, with the filler mass, has essentially trapezoidal shape. The longer side of the trapezoid is adjacent the outer wall 21. The embossed foil 25 is carried over the reinforcement formed by the filler 35 and the reinforcement ring 31, and the plastic layer, which has the multi-ply glass fiber fabric 29 embedded therein, likewise, is placed over the reinforcement ring. The reinforcement ring 31 can be placed on top of the protective layer 22 which coats the inner surface of the outer wall 21.

Figure 3:
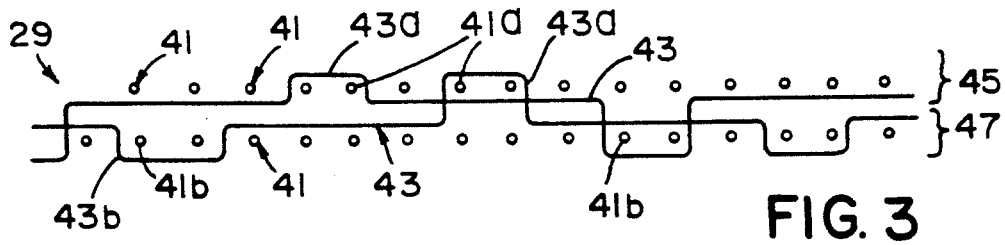
FIG. 3 is a highly schematic cross section through a two-ply or two-layer woven reinforcement fabric.
Figure 4:
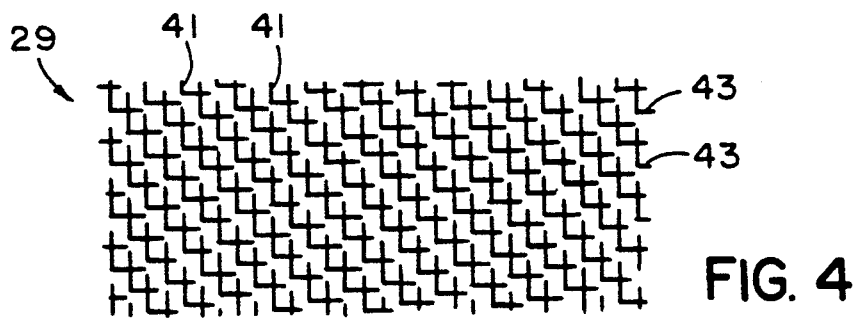
FIG. 4 is a top view of the fabric of FIG. 3.

The multi-ply, preferably double-ply glass fiber fabric, in which the weave is such that the respective plies are interlocked, is not merely a duplication of a single-ply reinforcement. Referring now to FIGS. 3–7: The fabric is best shown in FIGS. 3 and 4, in connection with a double-ply fabric 29. As illustrated in FIG. 3, two layers of warp strands or threads or warp yarns 43 and two layers of weft strands or threads or weft yarns 41 are located above each other. The weave, thus, has two layers 45, 47. As can be seen in FIG. 3, the warp thread 43a overlaps the weft thread 41a in some regions, and then passes below the lower fabric layer 47 to overlap the weft threads 41b of the layer 47. Likewise, the warp thread 43b overlaps and surrounds the weft threads 41b of the layer 47, and, later on, crosses over to the layer 45 and runs over and around the weft threads 41a of the upper layer 45. FIG. 4 illustrates the resulting weave pattern in top view. Different types of weaves or weave patterns, of course, are possible, and the weave pattern shown in FIGS. 3 and 4 is only illustrative. It is of importance, however, that the weave pattern selected will have the reinforcement effect to be described in detail below.

Figure 5:
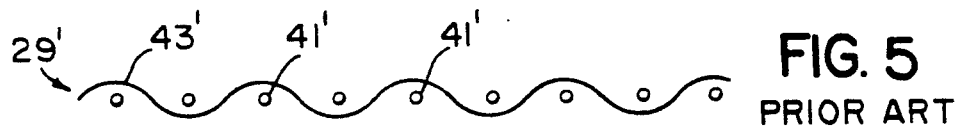
FIG. 5 is a view similar to FIG. 3 and illustrating a prior art reinforcement fabric.
Figure 6:
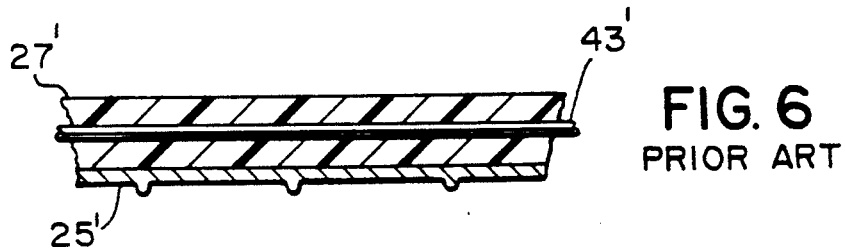
FIG. 6 is a fragmentary cross-sectional view through the inner wall of a tank in accordance with the prior art.
Figure 7:
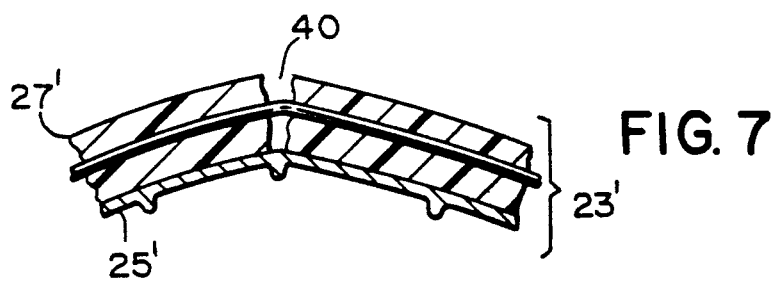
FIG. 7 is an illustration of what happens to the prior art inner wall when the inner wall is subjected to a bending stress.

The multi-layer fabric results in a reinforcement effect which is best seen when the behavior of a plastic layer is considered which, in known manner, is reinforced by a single-layer reinforcement fabric 29'—see FIG. 5. FIG. 6 illustrates an embossed foil 25' on which a plastic layer 27' is applied, reinforced by the single-ply fabric 29'. In FIG. 6, only the warp thread 43' is visible. In FIGS. 3 and 5, of course, the respective yarn or thread positions are shown schematically, and spaced from each other for ease of illustration. In actual practice, they will be engaged against each other. If the laminate 23', formed of foil 25' and plastic layer 27', is bent, a fissure or tear 40 may occur in the plastic layer 27', which then can expose the foil 25', leading to leakage in the tank. FIG. 7 shows the bending and fissure greatly exaggerated for ease of explanation.

Constructing the laminate with a multi-layer or multi-ply fabric, preferably a two-layer or double-ply fabric 29, provides at all times two superposed threads or yarns 41—see FIG. 8—or interlocked together. This arrangement increases the bending strength considerably, and substantially above that of merely twice the bending strength of the structure of FIG. 6. The duplication, because of the interaction of the plies with respect to each other, thus results in an inner tank wall which is substantially stronger than what may be expected by only duplication of fabric material.

In accordance with a feature of the invention, glass fibers are used for the fabric which have an extremely high tensile strength. By optimal reinforcement of the plastic layer by a double, or other multi-layer fabric, and particularly one in which the layers are interlocked with each other, excellent embedding and binding with the plastic material can also be achieved. Preferably, the warp and weft threads 41, 43, each, are formed of a plurality of thin glass fibers of about 0.02 to 0.05 mm diameter. They can be wetted well by plastic material, so that the fabric 29 can be readily filled with plastic material and the inter-bonding between the fibers and the plastic is excellent. In addition, however, the fabric is extremely flexible and hence can be readily shaped and placed over the already plastic-coated embossed foils, whether following the internal surface of the tank wall or overlapping reinforcement rings.

A particularly suitable glass fiber fabric for the reinforcement is a two-layer glass fiber fabric having a weight of about 0.45 kg per square meter. Such a fabric can be easily handled, also overhead, without danger that it will fall down, as soon as it is embedded in the still not cured and hence tacky plastic material. This is of particular importance when existing tank installations are to be retrofitted with an internal tank wall, or an internal tank wall of an existing double-layer tank is to be repaired.

EXAMPLE OF A TEST OF A TANK MADE IN ACCORDANCE WITH THE PRESENT INVENTION

A cylindrical tank of 20,000 liter capacity is supplied with an internal layer of embossed or puckered aluminum of nominal 0.2 mm thickness, on which a plastic layer is applied having embedded therein the glass fiber fabric, in form of fabric webs or sheets. The fabric has a weight of 0.45 kg/m$^2$.

After curing, and for a test, the tank was filled to a height of 1.6 m with water. The space 19 between the inner wall and the outer wall was likewise filled to the same level with water. Thereafter, the water was pumped out of the tank, but left within the space 19.

The tank could be completely emptied without formation of a bulge. After emptying, a vacuum of 0.0072 bar was formed in the space 19 above the water level therein. Only after air was admitted to the space 19, an elongated bulge of about 50 cm width formed at the bottom of the inner wall, and extending longitudinally along the tank. After formation of the bulge, a pressure of 0.05 bar was present at the inner wall. This pressure corresponds to a water column of about ½ m, or a column of combustion fluid, for example gasoline, of about 0.7 m.

To test the tank further for leakage, three adults walked on the tank after the bulge had been formed. A ladder was placed at the apex of the bulge, and one of the persons, weighing 85 kg, left the tank by climbing up the ladder. A wrench, weighing 0.6 kg, was dropped from a height of 3 m towards the bulge, with the tip pointed downwardly. The test persons ran about on the bottom of the bottom of the tank and primarily on the bulge, and even though the bulge continued to be loaded by the ladder, and was subjected to a dropped tool, no damage could be done to the inner wall. At the point of impact of the wrench, a slight depression of about 1 cm$^2$ cross section was formed.

Figure 9:
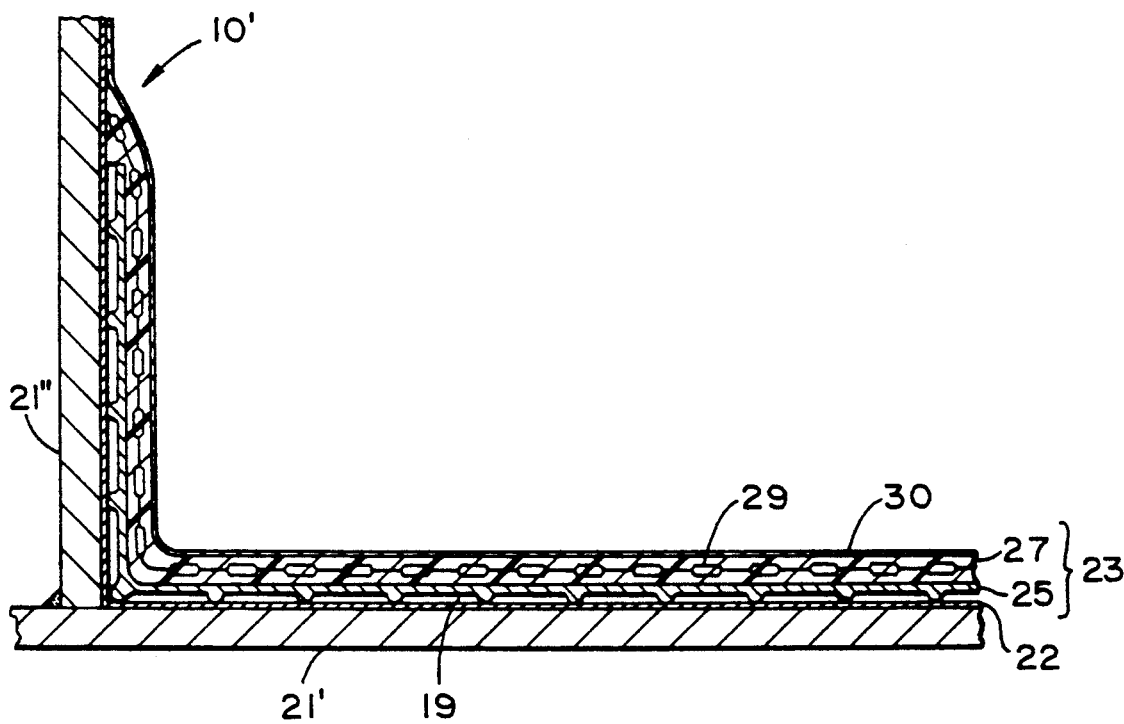
FIG. 9 is a cross-sectional view through a vertical, upstanding tank, in which the inner wall is formed in accordance with the present invention.

The invention is not limited to horizontal cylindrical tanks. FIG. 9 illustrates an upright cylindrical tank with a double wall, suitable for checking for leakage. The lower or outer bottom 21' and the side wall 21" correspond to the outer wall 21 of FIG. 1. The upper or inner wall 23 is carried upwardly along the side wall 21". It is a laminate which corresponds entirely to the structure of the inner wall described in connection with FIG. 1, and thus the same reference numerals have been used in FIG. 9. The construction of the laminate, and the method of its manufacture, is the same as heretofore described. As can be seen, the embossed foil 25 terminates short of the reinforced fabric plastic coating 23, which, beyond the termination of the foil 25, is adhered to the inner wall 21". A similar attachment can be made in the tank of FIG. 1 at the end portion adjacent the axis opening 12, with the vacuum pipe 17 and test pipe 24 introduced into the space 19, and entirely surrounded and embedded by the reinforced fiber layer. It is to be noted that the fabric 29 extends beyond the end of the last embossed foil element 25—see FIG. 9 at the end region 10'.

Various changes and modifications may be made, and any features described herein may be used with any others, within the scope of the inventive concept.

A suitable material for the filler 35 (FIG. 2) between the reinforcement ring 31 and the inner surface of the outer wall 21 is: cement mortar.

I claim:

1. A double-wall tank having
an outer wall (21) and an inner wall (23),
wherein the inner wall comprises;
   a foil element (25) having projections extending from the major surface of the foil element towards the inner surface of the outer wall (21), said foil element having a ridged surface facing the outer wall;
   a plastic layer (27) having a reinforcement material embedded therein, whereby the plastic layer and the reinforcement material forms a reinforced plastic layer, said reinforced plastic layer covering the foil element and forming with said foil element a laminated structure (23), and
   wherein the reinforced plastic layer has terminal end regions at an uppermost portion thereof and said terminal end regions extend beyond the foil element and are sealingly connected to the inner surface of the outer wall (21) to define a leakage test space (19) between the inner surface of the outer wall (21) and the facing surface of the foil element (25) for testing the double-wall tank for leakage,
   and wherein the reinforcement material comprises
   at least two layers of woven fabric (29) having strands or threads of high strength material in which said at least two layers are interlocked by at least some of the strands of the fabric of one layer extending into the other layer, over and around at least some of the strands of the fabric of the other layer and extending back into said one layer again, over and around at least some of the strands of the fabric of said one layer.

2. The tank of claim 1, wherein the strands of said high strength material comprise glass fibers.

3. The tank of claim 2, wherein said fabric of glass fibers comprises multiple woven glass fiber layers.

4. The tank of claim 1, wherein the strands of said high strength material of said fabric comprise glass fibers.

5. The tank of claim 1, wherein said fabric is a woven fabric having warp strands and weft strands; and
   wherein the respective warp strands and weft strands comprise a plurality of thin glass fibers.

6. The tank of claim 1, wherein the foil element comprises terminal edges which are located in overlapping relationship and define, therewith, overlapping end regions.

7. The tank of claim 1, wherein the foil element is prime coated on at least one surface thereof.

8. The tank of claim 1, wherein the foil element comprises aluminum foil having a thickness in flat regions of between 0.15 mm to 0.3 mm.

9. The tank of claim 1, wherein the foil elements comprise one of the group consisting of paper webs, cardboard webs, plastic foils and plastic webs.

10. The tank of claim 1, wherein said plastic layer (27) comprises an epoxy layer.

11. The tank of claim 1, further including a reinforcement ring (31) located on the inner surface of the outer wall, projecting inwardly of the tank and formed with at least one laterally projecting portion extending essentially parallel to said inner surface;
   a filler material (35) filling the space between said at least one laterally projecting portion and said inner surface and, in combination with said reinforcement ring, defining a composite ring, said composite ring having at least approximately trapezoidal cross section with the larger side of the trapezoid facing the inner surface of the outer wall; and
   wherein said laminated structure of the foil element (25) and the at least two layer woven fabric reinforced plastic layer is placed over the thus formed composite ring.

12. The tank as in claim 1 made by the method comprising the steps of
   placing at least one foil element on the inside surface of the outer wall (21) of the tank;
   applying a plastic coating over the foil element (25) and on the inner wall at a region adjacent a terminal portion of the foil element;
   applying, on said plastic coating before the plastic coating has cured, a multi-layer reinforcing fabric including strands of high strength material, in which said layers are interlocked by at least some of the strands of the fabric of one layer extending into the other layer, over and around at least some of the strands of the fabric of the other layer; and
   rolling-in the multi-layer fabric into the still uncured plastic coating to embed the fabric therein.

13. The method of claim 12, further including the step of applying a further layer of plastic coating over the still uncured layer with the fabric embedded therein.

14. The method of claim 12, including the step of testing the inner wall for leakage by a high voltage testing apparatus after curing of the inner wall.

15. The method of claim 12, including the step of applying a vacuum in said leakage test space (19) formed between the inner surface of the outer wall and the facing surface of the ridged foil, and maintaining the vacuum until the plastic material has cured.

16. The method of claim 12, wherein the step of coating the foil element and the step of coating surfaces of the inner wall adjacent an end region of the foil element comprises applying a resin by an air-free spray process.

17. The method of claim 12, wherein the tank includes at least one reinforcement ring (31) having an internal laterally projecting portion extending approximately parallel to the inner wall and spaced therefrom; and
   further including the step of filling the space between the laterally projecting portion and the inner surface of the inner wall with a filler material (35) which is shaped and dimensioned to form, together with the reinforcement ring, an essentially, in cross section, trapezoidal inwardly extending composite ring; and
   wherein the step of placing the foil element on the inner wall of the tank comprises overlapping the reinforcement ring with the foil element, with the ridges therefrom extending towards said ring.

* * * * *